United States Patent [19]

Smith

[11] Patent Number: 4,896,791
[45] Date of Patent: Jan. 30, 1990

[54] COUPON DISPENSING SYSTEM

[75] Inventor: William C. Smith, Providence, R.I.

[73] Assignee: The Savings Spot, Ltd., Providence, R.I.

[21] Appl. No.: 273,161

[22] Filed: Nov. 10, 1988

Related U.S. Application Data

[63] Continuation of Ser. No. 5,202, Jan. 20, 1987, abandoned.

[51] Int. Cl.⁴ .............................................. G07F 11/00
[52] U.S. Cl. ........................................ 221/7; 221/8; 235/381; 235/385; 364/479
[58] Field of Search ............. 364/479, 464.01, 404, 364/405; 235/381, 383, 384, 385; 221/7, 8, 221; 186/52

[56] References Cited

U.S. PATENT DOCUMENTS

| | | | |
|---|---|---|---|
| 3,059,112 | 10/1962 | Rogal | 235/383 |
| 3,401,830 | 9/1968 | Mathews | 221/2 |
| 3,491,870 | 1/1970 | Isserstedt | 221/2 |
| 3,632,995 | 1/1972 | Wilson | 283/56 |
| 3,786,421 | 1/1974 | Wostl et al. | 235/381 |
| 4,124,109 | 11/1978 | Bissell et al. | 194/210 |
| 4,377,049 | 3/1983 | Simon et al. | 221/2 |
| 4,454,670 | 6/1984 | Bachmann et al. | 40/584 |
| 4,554,446 | 11/1985 | Murphy et al. | 235/385 |
| 4,750,120 | 6/1988 | Takahashi | 364/405 |
| 4,767,917 | 8/1988 | Ushikudo | 235/381 |

Primary Examiner—H. Grant Skaggs
Attorney, Agent, or Firm—Joseph S. Iandiorio

[57] ABSTRACT

A coupon dispensing system which displays a number of images, each image representing a product to be promoted and including a product selection area to be manipulated by a consumer to select that product. A switch is associated with each selection area to register the selection. The system receives an access code unique to the consumer, records product selections made by the consumer, compares the product selected by the consumer with a preselected quota, and issues a coupon for the product selected by the consumer if the quota for that consumer is not exceeded.

15 Claims, 3 Drawing Sheets

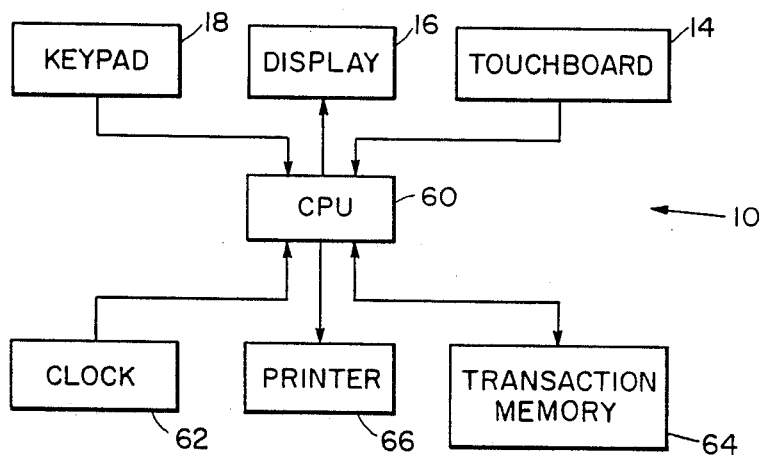
*Fig. 3*
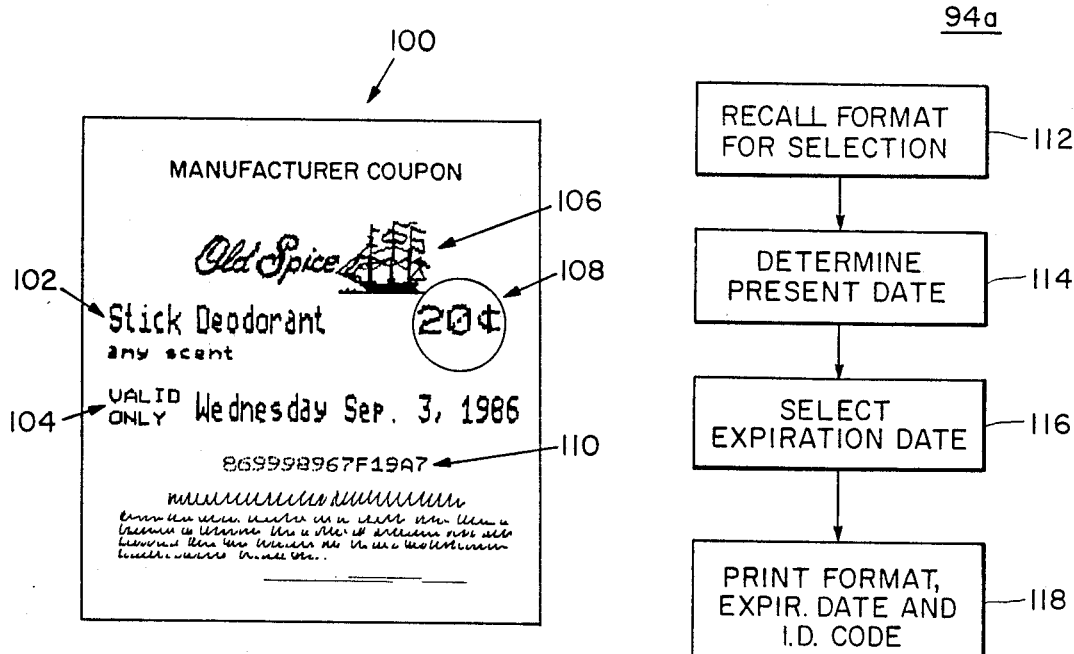
*Fig. 5*
*Fig. 6*

COUPON DISPENSING SYSTEM

This is a continuation of application Ser. No. 005,202 filed Jan. 20, 1987, now abandoned.

FIELD OF INVENTION

This invention relates to a system for dispensing coupons and more particularly to a system which displays a number of high-resolution images which a consumer touches to select one or more products for which to receive a coupon, and before issuing that coupon determines whether the consumer's allotment has already been taken.

BACKGROUND OF INVENTION

Millions of dollars are spent annually on promotional programs involving coupons such as manufacturers' coupons which are redeemed by a consumer at a grocery and other store. Most manufacturers' coupons are delivered in local newspapers or mailed directly to a household and are distributed among as many consumers as possible. Further, such coupons are primarily intended to introduce consumers to a product rather than to provide a discount for every purchase of that product by the same consumer.

Coupon distribution poses a number of problems. Employees of a store can collect and redeem identical coupons from a number of promotional inserts carried within newspapers sold at the store. Further, there is little control over retailers who might send in a number of coupons for redemption whether or not goods have actually been purchased for those coupons.

There are several types of electronic coupon dispensing systems which issue coupons within a store. One system utilizes UPC scanner information to deliver coupons after a corresponding product is purchased. Misredemption may occur if the cashier scans the same product more than once or keeps the coupons intended for the shopper.

Other systems are operated by the shopper instead of the cashier. Several systems utilize a TV screen which displays textual information such as categories of coupons and lists of coupons within each category. The displays are not attractive or inviting to the shopper and many of the same coupons can be obtained by each shopper who actually uses the machine. One machine attempts to limit issuance of coupons by allowing the same coupon to be issued only once each time its category is selected. However, a shopper or retailer can alternate between categories and repeatedly withdraw the same coupons.

One system presents text on a touch CRT screen. Thirty or forty different coupons are listed on the screen and the consumer touches the appropriate portion of the screen to select a coupon. Touch CRT screens are very expensive, however, and the display is not inviting to the consumer.

Another coupon dispensing system reads cards having a magnetic strip, such as a credit card or bank teller card. This system compares the identification on the card with the identifications on the last several hundred cards presented, and allows use of the machine if the current identification does not match that of the previous several hundred transactions.

Yet another coupon dispensing system attempts to limit issuance of coupons by issuing an identification code to each consumer and permitting consumer access to the machine only once each distribution period. The consumer's identification code is printed on each coupon. Upon access a predetermined number of coupons are issued to the consumer whether or not the consumer plans to use the coupons within the expiration period. If the consumer returns to the store during that distribution period he is denied access to all coupons, even those that he had not used before but might be encouraged to use this time.

SUMMARY OF INVENTION

It is therefore an object of this invention to provide an improved coupon dispensing system which increases consumer participation in obtaining coupons while reducing the occurrence of coupon misredemption.

It is a further object of this invention to provide such a coupon dispensing system which increases consumer recognition of a product during selection of a coupon for that product.

It is a further object of this invention to provide such a coupon dispensing system which can print customized indicia on a coupon such as the logo of the manufacturer to further promote the product.

It is a further object of this invention to provide such a coupon dispensing system which enables a consumer to select a number of coupons at a time, but limits repeated issuance of the same coupon.

It is a further object of this invention to provide such a coupon dispensing system which records information of consumer usage and product selection which can be utilized for market research.

Yet another object of this invention is to provide such a coupon dispensing system which can select different expiration dates to be printed on the coupon.

It is a further object of this invention to provide such a coupon dispensing system which can issue manufacturers' coupons, refund coupons, sweepstakes tickets, or other promotional material.

This invention results from the realization that a truly effective coupon dispensing machine can be achieved by a system which displays a high resolution, photographic quality printed image of each of a number of products and enables selection of a coupon by the touching of a portion of the image, and which limits the issuance of a coupon for the product based on previous product selections made by that consumer.

This invention features a coupon dispensing system. There are means for displaying a plurality of images, each image representing a product to be promoted, and further including a product selection area to be touched by a consumer to select that product. There are also switch means associated with each selection area to register the selection, input means for receiving an access code unique to the consumer, and means for recording product selections made by the consumer. The system further includes means for issuing a coupon for the product selected by the consumer, and means, responsive to the input means and the means for recording, for comparing the product selected by the consumer with a preselected quota and for preventing issuance of a coupon for that product if the consumer has exceeded the quota.

In one embodiment, the images of the products are high-resolution, pictorial representations of the products such as photographic prints. The means for displaying may include a sheet of material carrying the images and the product selection areas. The switch means includes one or more touch-sensitive membrane switches having active switch areas at the selection areas. The access code is a numeric or alphanumeric code and the input means includes key pad means for entering the access code.

In another embodiment, the means for limiting includes clock means for establishing successive time periods during which coupons are issued. The means for limiting further includes means for restricting coupon issuance of the product for each consumer during each time period such as by limiting coupon issuance to one coupon per product per time period or to one coupon per category per time period. The means for issuing may include means for printing indicia on each coupon such as a logo for that product, and may further include means for selecting an expiration date to be printed on the coupon. The means for selecting may include timing means for determining the date of issuance of the coupon, and the dispensing system may further include message display means for presenting messages to the consumer.

This invention also features a coupon dispensing system including means for displaying a plurality of images each of which represents a product to be promoted and includes a product selection area to be actuated by a consumer to select that product. The system further includes switch means, associated with each selected area, for registering the selection by responding to consumer actuation, and means for determining previous product selections made by that consumer. There is also means, responsive to the means for determining and the switch means, for comparing product selections made by the consumer with a preselected quota and for issuing a coupon for that product if a consumer has not exceeded the quota.

DISCLOSURE OF PREFERRED EMBODIMENT

Other objects, features and advantages will occur from the following description of a preferred embodiment and the accompanying drawings, in which:

FIG. 3 is a block diagram of the coupon dispensing system of FIG. 1;

FIG. 5 is a schematic diagram of a customized coupon issued by the system of FIG. 1; and FIG. 6 is a flow chart of the operation involved in printing the coupon of FIG. 5.

This invention may be accomplished by a coupon dispensing system which displays a number of high-resolution images, each image representing a product to be promoted and including a product selection area to be touched by a consumer to select that product. A touch-sensitive switch is associated with each selection area to register the selection when that area is depressed by the consumer. The system issues a coupon for the product selected by the consumer based on previous product selections made by that consumer.

Figure 1:
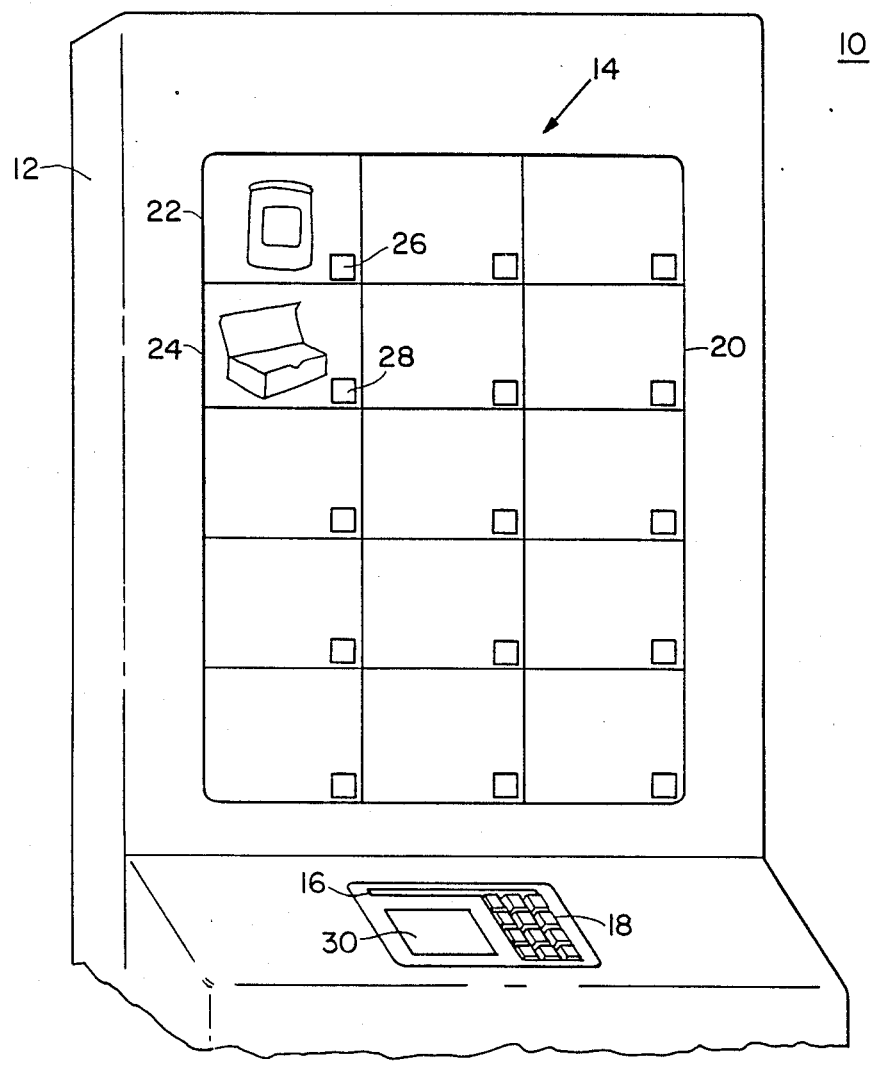
FIG. 1 is a schematic axonometric view of a coupon dispensing system according to this invention.
Figure 2A:
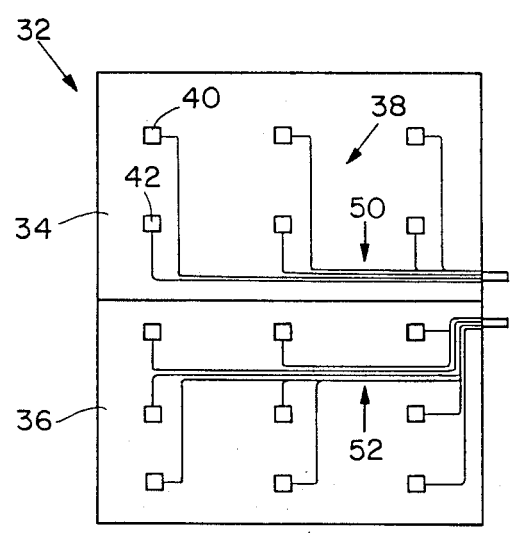
FIG. 2A is a schematic diagram of the membrane switches within the touchboard shown in FIG. 1.
Figure 2B:
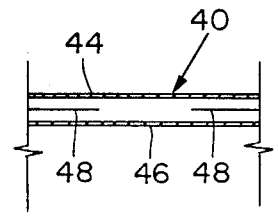
FIG. 2B is a cross-sectional view of a portion of one of the membrane switches shown in FIG. 2A.

Coupon dispensing system 10, FIG. 1, includes dispensing machine 12 having touchboard 14, message display 16, and key pad 18. Touchboard 14 includes print 20 which is a single sheet of material carrying images of products to be promoted such as images 22, 24. Each image includes a product selection area such as areas 26, 28 for product images 22, 24, respectively. A consumer, attracted by the high-resolution photographic quality of print 20, is prompted by message display 16 or by instruction card 30 to enter his unique access code through key pad 18. Once coupon dispensing system 10 accepts the access code, the consumer is prompted to select the coupons of his choice. The consumer accomplishes the selection in this construction by actually touching one or more of the product selection areas such as areas 26, 28. A touch-sensitive switch such as switch 32, FIG. 2, includes switch segments 34, 36 each having a number of active switch areas 38 such as switch areas 40, 42. Membrane switches 34, 36 are conventional switches such as those available from Oak Switch Systems, Inc., Crystal Lake, Ill.. A portion of membrane switch 34 is shown in cross-section in FIG. 2B to reveal upper membrane 44 and lower membrane 46 separated by spacer 48. A conductive grid is disposed on the inner surfaces of membrane 44, 46 so that when membrane 44 is depressed in an active area such as area 40, the upper and lower membranes make contact to register the selection. Active area 40 is approximately 0.625 by 0.625 inches and spacer 48 is approximately 0.005–0.010 inches in thickness. Conductive leads 50, 52 carry signals from touchboard 14 to central processing unit 60, FIG. 3, which is also responsive to clock 62, transaction memory 64 for recording consumer transactions, and key pad 18 which receives the access code unique to the consumer. Memory 64 includes a removable diskette so that transaction records can readily be removed for analysis. If the consumer has not exceeded his quota, central processing unit 60 activates printer 66 to print a customized coupon for the selected product.

Figure 4:
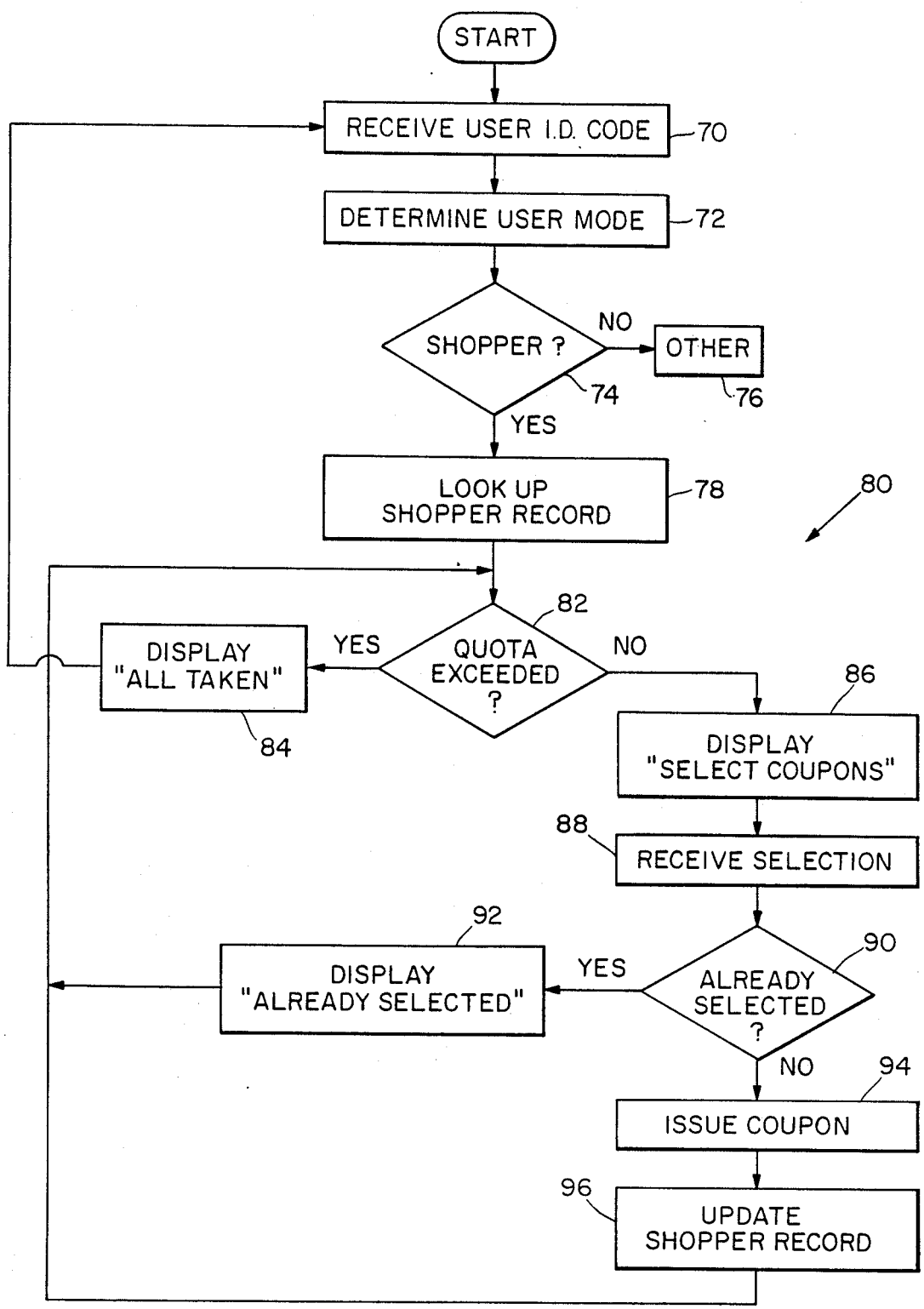
FIG. 4 is a flow chart of the operation of the central processing unit shown in FIG. 3.

The operation of central processing unit 60 is shown in FIG. 4. The user of coupon dispensing system 10 enters an identification code which is received, step 70, and identified in steps 72, 74. If the user is not a shopper, other routines 76 are conducted, such as a demonstration routine in which a demonstration coupon is printed, or a manager's routine in which clock 62 is reset or a status report is printed of coupon selections. Routine 76 can also include a new shopper routine, accessable by authorized personnel only, during which an access code is selected for the shopper. The authorized personnel enters the shopper's phone number, and the system calculates a numeric or alphanumeric access code unique to that shopper that is developed from the phone number. The system then displays the access code to the shopper.

If the user is a shopper having an authorized access code, the shopper record is recalled, step 78, and loop 80 is entered. It s determined in step 82 whether all allotted coupons have already been taken by the shopper. In one construction, a quota is allowed of one coupon per product per period of time such as a one-week interval measured by clock 62, FIG. 3. In another construction, one coupon is permitted for each of a number of categories such as soups or beverages. If it is determined from the shopper record that the consumer has already received all possible coupons, the system displays that all the coupons are taken, step 84, and the logic returns to step 70 to await the next user.

If one or more coupons remain available to the shopper, the system requests the shopper to select a coupon, step 86, and awaits a selection to be made by that consumer, step 88. The selection is compared to previous selections made by that shopper, step 90, and if that particular coupon was previously selected the message "already selected" is displayed, step 92, and the logic proceeds to step 82. If that coupon has not been selected, a coupon is issued, step 94, and the shopper record is updated, step 96.

Coupon dispensing system 10 can issue a preprinted coupon or can customize a standard blank to produce a coupon such as manufacturer coupon 100, FIG. 5. Coupon 100 is printed by printer 66 such as a dot matrix printer available from GTECH Corporation, Providence, R.I., and includes product description 102, expiration information 104, manufacturer logo 106, coupon value 108, and consumer identification number 110. The printing of logo 106 further promotes the product to the shopper, and shopper identification code 110 identifies the shopper to permit market research.

The procedure for printing coupon 100 is shown in FIG. 6 as routine 94a. As the shopper's selection is received, a format for that selection is recalled, step 112, which includes the product description, manufacturer logo, and coupon value. The present date is determined, step 114, and the expiration date to be printed on the coupon is then selected, step 116. In one construction, the coupon is valid for the date of issuance only in which case the present date is printed as the expiration date. The format, expiration date and identification code for that shopper are then printed onto a blank coupon, step 118.

While the coupon dispensing system has been described as a dispenser of manufacturers' coupons, this is not a limitation of the invention. Promotional programs such as refund offers, sweepstakes and surveys may also be conducted by placing the appropriate images on the touchboard. The term coupon is intended to encompass any promotional program deliverable through a machine. Restricted distribution of the coupon is ensured by qualifying the consumer before the coupon is issued for a product. The term product includes services such as airlines and hotels. Moreover, in other constructions, the product selection areas can be activated by the consumer through toggle switches or light pens.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A consumer selectable coupon dispensing system, comprising:
   one or more image areas, each image area including means for displaying a representation of a product to be promoted for which a single coupon is selectable;
   each image area further including an associated selection device to be manipulated by a consumer to select a coupon for said product;
   switch means associated with each selection device to register the current coupon selection;
   input means for receiving an access code identifying the consumer;
   means, within the system and responsive to said input means, for identifying coupons previously issued to said consumer;
   means, responsive to said means for identifying, for establishing a coupon quota for said consumer;
   means, responsive to said means for establishing a coupon quota and said means for registering the current coupon selection, for comparing said current coupon selection made by the consumer with the consumer's coupon quota, and for preventing issuance of the selected coupon if the consumer's established quota has been exceeded;
   means, responsive to said means for comparing, for printing the selected coupon;
   means, responsive to said means for comparing, for updating said means for identifying coupon selections made by the consumer, to include the current selected and printed coupon; and
   means for recording and storing within the system, said consumer's updated coupon selections.

2. The coupon dispensing system of claim 1 in which said pictorial representation includes a photographic print of that product.

3. The coupon dispensing system of claim 1 in which said means for displaying includes a sheet of material carrying said pictorial representation.

4. The coupon dispensing system of claim 1 in which each of said switch means includes a touch-sensitive membrane switch having an active switch area at said product selection device.

5. The coupon dispensing system of claim 1 in which said access code is a numeric or alphanumeric code and said input means includes keypad means for entering said access code.

6. The coupon dispensing system of claim 1 in which said means for comparing and preventing includes clock means for establishing a time period during which said quota is imposed.

7. The coupon dispensing system of claim 6 in which said means for comparing and preventing further includes means for restricting coupon issuance per product for each consumer during each time period.

8. The coupon dispensing system of claim 7 in which said means for restricting limits coupon issuance to one coupon per product per time period.

9. The coupon dispensing system of claim 7 in which the products are grouped in categories and said means for restricting limits coupon issuance per product category, per time period.

10. The coupon dispensing system of claim 9 in which said means for restricting limits coupon issuance to one coupon, per product category, per time period.

11. The coupon dispensing system of claim 1 in which said means for printing includes means for printing indicia on each coupon.

12. The coupon dispensing system of claim 11 in which said indicia includes a logo for that product.

13. The coupon dispensing system of claim 1 in which said means for comprising and preventing further includes means for selecting an expiration date to be printed on said coupon.

14. The coupon dispensing system of claim 13 in which said means for selecting includes timing means for determining the date of issuance of said coupon.

15. The coupon dispensing system of claim 1 further including message display means, responsive to said input means identifying the consumer, for presenting messages to the consumer.

* * * * *